United States Patent
Kim et al.

(10) Patent No.: US 11,438,958 B2
(45) Date of Patent: Sep. 6, 2022

(54) METHOD FOR TRANSMITTING SIGNAL RELATING TO PDU IN WIRELESS COMMUNICATION SYSTEM AND DEVICE THEREFOR

(71) Applicant: LG ELECTRONICS INC., Seoul (KR)

(72) Inventors: Laeyoung Kim, Seoul (KR); Taehun Kim, Seoul (KR); Myungjune Youn, Seoul (KR); Jinsook Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 17/045,745

(22) PCT Filed: May 9, 2019

(86) PCT No.: PCT/KR2019/095012
§ 371 (c)(1),
(2) Date: Oct. 6, 2020

(87) PCT Pub. No.: WO2019/216749
PCT Pub. Date: Nov. 14, 2019

(65) Prior Publication Data
US 2021/0059003 A1  Feb. 25, 2021

(30) Foreign Application Priority Data

May 9, 2018 (KR) .................. 10-2018-0053373

(51) Int. Cl.
*H04W 76/27* (2018.01)
*H04W 76/19* (2018.01)
(Continued)

(52) U.S. Cl.
CPC ......... *H04W 76/27* (2018.02); *H04W 68/005* (2013.01); *H04W 76/19* (2018.02); *H04W 76/36* (2018.02)

(58) Field of Classification Search
CPC combination set(s) only.
See application file for complete search history.

(56) References Cited

U.S. PATENT DOCUMENTS

2018/0176834 A1\* 6/2018 Wei .................... H04W 36/0072
2018/0199398 A1\* 7/2018 Dao .................... H04L 41/5041
(Continued)

FOREIGN PATENT DOCUMENTS

WO      2017/085621 A1    5/2017
WO      WO-2017085621 A  * 5/2017    ............ H04W 12/06
(Continued)

OTHER PUBLICATIONS

NPL Document, technical specification group services and system aspects; Procedure for the 5G system; stage 2 (release 15), Mar. 2018 (Year: 2018).*
(Continued)

*Primary Examiner* — Mewale A Ambaye
(74) *Attorney, Agent, or Firm* — Dentons US LLP

(57) ABSTRACT

An embodiment of the present disclosure provides a method for transmitting or receiving a signal relating to a PDU session of a UE in a wireless communication system, the method includes the steps of: transmitting, by a UE in a RRC inactive state, a RRC message for resuming to a base station; and receiving, by the UE, information indicating release of a resource from the base station in response to the RRC message for resuming, wherein the release of the resource is caused by the deactivation of a PDU session of the UE.

11 Claims, 14 Drawing Sheets

(51) Int. Cl.
    *H04W 76/36*     (2018.01)
    *H04W 68/00*     (2009.01)

(56) References Cited

U.S. PATENT DOCUMENTS

| | | | | |
|---|---|---|---|---|
| 2019/0230556 A1* | 7/2019 | Lee | ........................ | H04W 60/00 |
| 2019/0268963 A1* | 8/2019 | Kim | .................. | H04W 52/0241 |
| 2019/0306251 A1* | 10/2019 | Talebi Fard | ............ | H04L 67/12 |

FOREIGN PATENT DOCUMENTS

| | | |
|---|---|---|
| WO | 2017/126922 A1 | 7/2017 |
| WO | 2017/188758 A1 | 11/2017 |

OTHER PUBLICATIONS

CATT, "Security issues related to RRC resume procedure from inactive state", R2-1801834, 3GPP TSG RAN WG2 #101, Athens, Greece, Feb. 26-Mar. 2, 2018, See pp. 1-4.

3GPP TS 38.413 V0.8.0, "3rd Generation Partnership Project; Technical Specification Group Radio Access Network NG-RAN; NG Application Protocol (NGAP)", (Release 15), (Apr. 2018), See pp. 74-76.

3GPP TS 23.501 V15.1.0, "3rd Generation Partnership Project; Technical Specification Group Services and System Aspects; System Architecture for the 5G System", Stage 2, (Release 15), (Mar. 2018).

3GPP TS 23.502 V15.1.0, "3rd Generation Partnership Project; Technical Specification Group Services and System Aspects; Procedures for the 5G System", Stage 2, (Release 15), (Mar. 2018).

3GPP TS 23.503 V15.1.0, "3rd Generation Partnership Project; Technical Specification Group Services and System Aspects; Policy and Charging Control Framework for the 5G System", Stage 2, (Release 15), (Mar. 2018).

* cited by examiner

METHOD FOR TRANSMITTING SIGNAL RELATING TO PDU IN WIRELESS COMMUNICATION SYSTEM AND DEVICE THEREFOR

This application is the National Stage filing under 35 U.S.C. 371 of International Application No. PCT/KR2019/095012, filed on May 9, 2019, which claims the benefit of Korean Patent Application No. 10-2018-0053373 filed on May 9, 2018, the contents of which are all hereby incorporated by reference herein in their entirety.

BACKGROUND OF THE DISCLOSURE

Field of the Disclosure

The following description relates to a wireless communication system, and more specifically, to a method and device for efficiently releasing resources in PDU session deactivation.

Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In wireless communication systems, various radio access technologies (RATs) such as LTE, LTE-A and WiFi are used and 5G is also included therein. Three main requirements of 5G include (1) enhanced mobile broadcast (eMBB) area, (2) massive machine type communication (mMTC) area and (3) ultra-reliable and low latency communications (URLLC) area. Some use cases may require multiple areas for optimization and other use cases may focus only on a single key performance indicator (KPI). 5G supports these various use cases through flexible and reliable methods.

eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

In addition, mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC includes new services that will change the industry through links with ultra-reliability/low latency, such as remote control of key infrastructure and self-driving vehicles. The level of reliability and latency is essential for smart grid control, industrial automation, robotics, drones control and coordination.

A plurality of use cases will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

SUMMARY

A technical object of the present disclosure is to provide a method for releasing resources in PDU session deactivation.

It will be appreciated by persons skilled in the art that the object that could be achieved with the present disclosure is not limited to what has been particularly described hereinabove and the above and other objects that the present disclosure could achieve will be more clearly understood from the following detailed description.

In an embodiment of the present disclosure, a method of transceiving a signal related to a protocol data unit (PDU) session of a user equipment (UE) in a wireless communication system includes: transmitting, by the UE in a radio resource control (RRC) inactive state, a RRC message for a resumption to a base station; and receiving information to instruct a release of resource in response to the RRC message for the resumption, wherein the release of the resource is based on a deactivation of the PDU session of the UE.

In an embodiment of the present disclosure, a method of transceiving a signal related to a PDU session of a base station in a wireless communication system includes: receiving, by the base station, an RRC message for a resumption from a UE in an RRC inactive state; and transmitting, by the base station, information to instruct a release of resource in response to the RRC message for the resumption from the UE, wherein the release of the resource is based on a deactivation of the PDU session of the UE.

In an embodiment of the present disclosure, a UE device in a wireless communication system includes: a memory; and at least one processor coupled to the memory, wherein the at least one processor is configured to transmit an RRC message for a resumption to a base station in an RRC inactive state and to receive information to instruct a release of resource in response to the RRC message for the resumption, and the release of the resource is based on a deactivation of a PDU session of the UE.

The information to instruct the release of the resource may be transmitted when the base station has received a PDU session release command from a network.

Initiation of transmission of the RRC message for the resumption may be irrespective of the PDU session release command received by the base station from the network.

The RRC message for the resumption may be transmitted from the UE in order to perform the resumption.

The RRC message for the resumption may be transmitted from the UE as a response to RAN paging.

The RAN paging may be irrespective of the PDU session release command received by the base station from the network.

The RRC message for the resumption may be transmitted from the UE after the base station receives the PDU session release command from the network.

The release of the resource may be a release of a data radio bearer (DRB).

The base station may be an NG-RAN.

The device may communicate with at least one of a mobile terminal, a network and a self-driving vehicle other than the device.

According to the present disclosure, it is possible to reduce UE paging that is less necessary only for PDU session deactivation.

It will be appreciated by persons skilled in the art that the effects that can be achieved with the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the present disclosure and are incorporated in and constitute a part of this application, illustrate embodiment(s) of the present disclosure and together with the description serve to explain the principle of the present disclosure. In the drawings.

DESCRIPTION OF EXEMPLARY EMBODIMENTS

Figure 1:
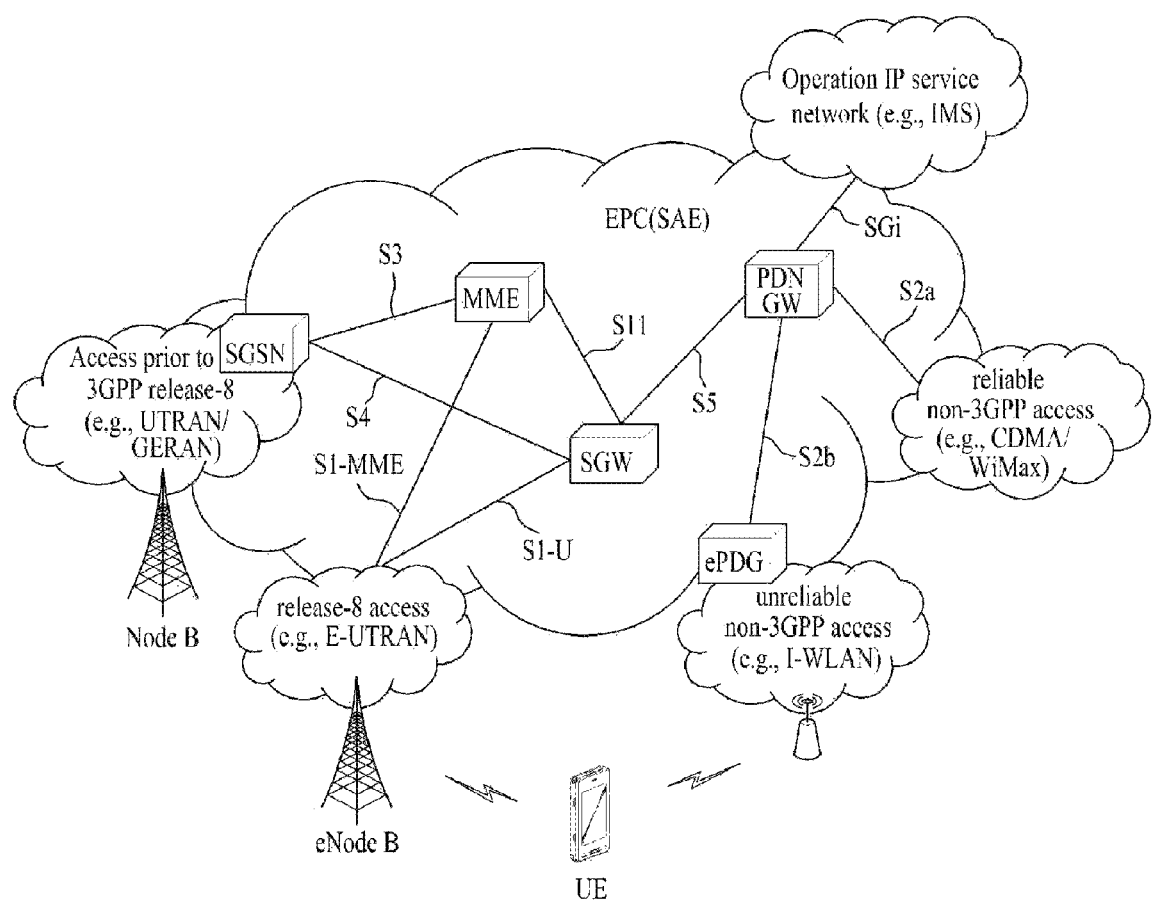
FIG. 1 illustrates a schematic structure of an evolved packet system (EPS) including an evolved packet core (EPC)

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present disclosure can be supported by those documents. Further, all terms as set forth herein can be explained by the standard documents.

The following technology can be used for various wireless communication systems. Although 3GPP LTE and 3GPP LTE-A systems will be mainly described below for clarity, the technical spirit of the present disclosure is not limited thereto.

The terms used in the present specification are defined as follows.

UMTS (Universal Mobile Telecommunications System): GSM (Global System for Mobile Communication) based third-generation mobile communication technology developed by 3GPP.

EPS (Evolved Packet System): A network system composed of an EPC (Evolved Packet Core) that is a PS (Packet Switched) core network based on IP (Internet Protocol) and an access network such as LTE/UTRAN. This is a network evolved from UMTS.

NodeB: A base station of GERAN/UTRAN, which is installed outdoors and corresponds in cell coverage size to a macro cell.

eNodeB: A base station of E-UTRAN, which is installed outdoors and corresponds in cell coverage size to a macro cell.

UE (User Equipment): User equipment. The UE may be called the terms such as a terminal, mobile equipment, and a mobile station. Further, the UE may be a portable device such as a notebook computer, a cellular phone, a personal digital assistant (PDA), a smart phone, or a multimedia device, or a device that is not portable, such as a personal computer (PC) or a vehicle-mounted device. In contents relating to MTC, the term "UE" or "terminal" may refer to an MTC device.

HNB (Home NodeB): UMTS network base station which is installed indoors and corresponds in cell coverage size to a micro cell.

HeNB (Home eNodeB): EPS network base station which is installed indoors and corresponds in cell coverage size to a micro cell.

MME (Mobility Management Entity): A network node of EPS network which executes mobility management (MM) and session management (SM) functions.

PDN-GW (Packet Data Network-Gateway)/PGW: A network node of EPS network which executes UE IP address allocation, packet screening and filtering, and charging data collection functions.

SGW (Serving Gateway): A network node of EPS network which executes mobility anchor, packet routing, idle mode packet buffering, and triggering an MME to page a UE.

NAS (Non-Access Stratum): A higher stratum of a control plane between a UE and an MME, which is a functional stratum for signaling and exchanging traffic messages between a UE and a core network in LTE/UMTS protocol stack. The NAS supports UE mobility and a session management procedure for establishing and maintaining IP connection between a UE and a PDN GW.

PDN (Packet Data Network): A network in which a server supporting a specific service (e.g., an MMS (Multimedia Messaging Service) server, a WAP (Wireless Application Protocol) server, or the like) is located.

PDN connection: Logical connection between a UE represented with an IP address (an IPv4 address and/or an IPv6 prefix) and a PDM.

RAN (Radio Access Network): A unit including an NodeB, an eNodeB and an RNC (Radio Network Controller) for controlling the same in a 3GPP network. This is present between UEs and provides connection to a core network.

HLR (Home Location Register)/HSS (Home Subscriber Server): A database having subscriber information in a 3GPP network. The HSS can execute functions such as configuration storage, identity management and user status storage.

PLMN (Public Land Mobile Network): A network configured to provide a mobile communication service to individuals. This can be configured per operator.

Proximity Service (or ProSe Service or Proximity based Service): A service providing discovery and direct mutual communication, communication via a base station or communication via a third device between physically neighboring devices. Here, user plane data is exchanged through a direct data path without passing through a 3GPP core network (e.g., EPC).

EPC (Evolved Packet Core)

FIG. 1 illustrates a schematic structure of an evolved packet system (EPS) including an evolved packet core (EPC).

The EPC is a core element of system architecture evolution (SAE) for improving the performance of 3GPP technologies. SAE corresponds to a research project for determining a network structure supporting mobility between various types of networks. For example, SAE aims to provide an optimized packet-based system for supporting various wireless access technologies based on IP and providing enhanced data transmission capability.

Specifically, the EPC is a core network of an IP mobile communication system for 3GPP LTE systems and can support packet-based real-time and non-real-time services. In a conventional mobile communication system (i.e., second-generation or third-generation mobile communication system), functions of a core network were realized through two distinguished sub-domains of CS (Circuit-Switched) for audio and PS (Packet-Switched) for data. However, in 3GPP LTE that is an evolution from the third-generation mobile communication system, CS and PS sub-domains unified into one IP domain. That is, connection between UEs having IP capability is configured through an IP based base station (e.g., an eNodeB (evolved Node B), an EPC, or an application domain (e.g., IP multimedia subsystem (IMS))) in 3GPP LTE. That is, the EPC is essential to realize end-to-end IP services.

The EPC can include various components and FIG. 1 illustrates a serving gateway (SGW), a packet data network gateway (PDN GW), a mobility management entity (MME), a serving general packet radio service (GPRS) supporting node (SGSN), and an enhanced packet data gateway (ePDG) which are some of the components.

The SGW (or S-GW) is a component that operates as a boundary point between a radio access network (RAN) and a core network and serves to maintain a data path between an eNodeB and a PDN GW. In addition, the SGW serves as a local mobility anchor point when a UE moves over an area served by an eNodeB. That is, for mobility in E-UTRAN (evolved-universal mobile telecommunications system (UMTS) terrestrial radio access network defined after 3GPP release-8), packets can be routed through the SGW. In addition, the SGW may serve as an anchor point for mobility with other 3GPP networks (RANs defined before 3GPP release-8, for example, UTRAN or global system for mobile communication (GSM)/enhanced data rates for global evolution (EDGE) radio access network (GERAN)).

The PDN GW (or P-GW) corresponds to a termination point of a data interface directed to a packet data network. The PDN GW can support policy enforcement features, packet filtering, charging support, etc. In addition, the PDN GW can serve as an anchor point for mobility management with respect to 3GPP networks and non-3GPP networks (e.g., an untrusted network such as an interworking wireless local area network (I-WLAN), a code division multiple access (CDMA) network and a trusted network such as WiMax).

Although the SGW and the PDN GW are configured as separate gateways in the example of the network structure of FIG. 1, the two gateways may be implemented according to a single gateway configuration option.

The MME is an element that executes signaling and control functions for supporting UE access to network connection, network resource allocation, tracking, paging, roaming and handover. The MME controls control plane functions related to subscriber and session management. The MME manages a large number of eNodeBs and performs signaling for selecting a conventional gateway for handover to other 2G/3G networks. In addition, the MME executes functions such as security procedures, terminal-to-network session handling, and idle terminal location management.

SGSN handles all types of packet data such as user mobility management and authentication with respect to other 3GPP networks (e.g., GPRS network).

ePDG serves as a security node for untrusted non-3GPP networks (e.g., I-WRAN, WiFi hotspot, etc.).

As described with reference to FIG. 1, a terminal having IP capability can access an IP service network (e.g., IMS) provided by a provider (i.e., operator) via various elements in the EPC based on non-3GPP access as well as 3GPP access.

In addition, FIG. 1 illustrates various reference points (e.g., S1-U, S1-MME, etc.). In 3GPP, a conceptual link connecting two functions present in different functional entities of the E-UTRAN and EPC is defined as a reference point. The reference points illustrated in FIG. 1 are arranged in Table 1. In addition to the examples of Table 1, various reference points may be present according to network structures.

TABLE 1

| Reference Point | Explanation |
| --- | --- |
| S1-MME | Reference point for the control plane protocol between E-UTRAN and MME. |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point that provides related control and mobility support between trusted non-3GPP access and PDN GW to a user plane. S2b is a reference point that provides related control and mobility support between ePDG and PDN GW to the user plane.

Figure 2:
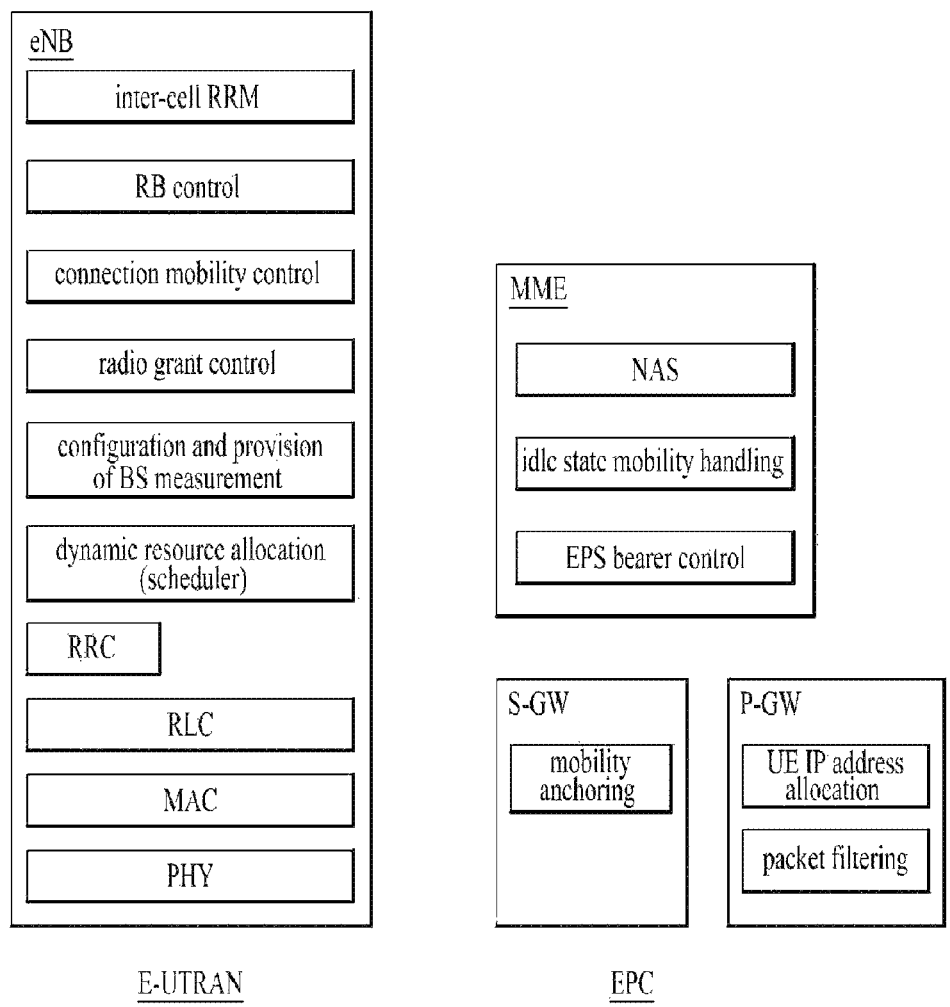
FIG. 2 is an exemplary diagram illustrating architectures of a general E-UTRAN and EPC.

FIG. 2 is an exemplary diagram illustrating architectures of a general E-UTRAN and EPC.

As illustrated, an eNodeB can execute functions for routing to a gateway during activation of radio resource control (RRC) connection, paging message scheduling and transmission, broadcast channel (BCH) scheduling and transmission, dynamic allocation of resources to a UE on uplink and downlink, configuration and provision for measurement of an eNodeB, radio bearer control, radio admission control, connection mobility control, and the like. In the EPC, paging generation, LTE-IDLE state management, user plane encoding, SAE bearer control, NAS signaling encoding and integrity protection functions can be executed.

Figure 3:
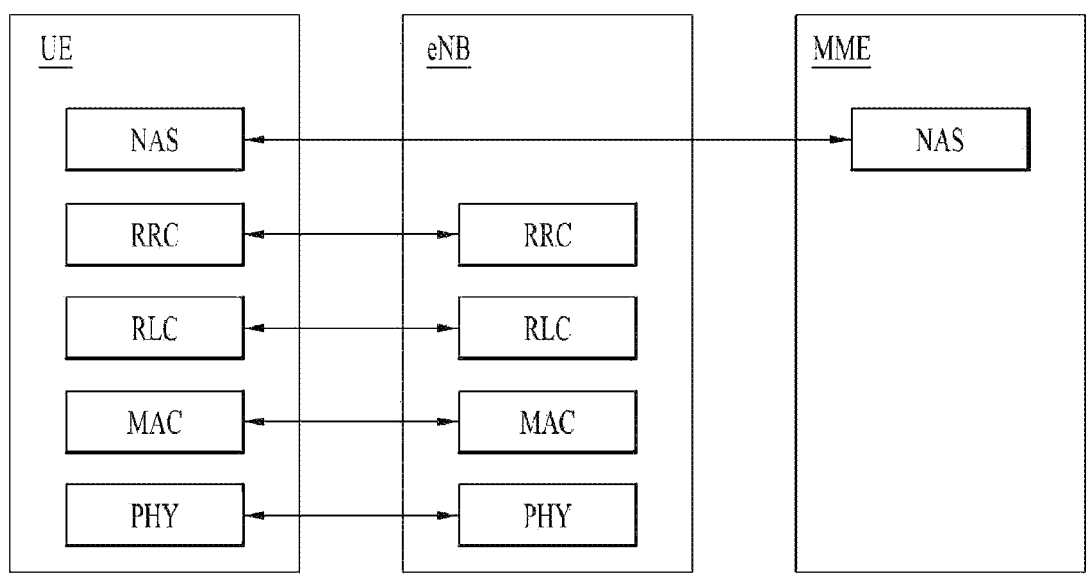
FIG. 3 is an exemplary diagram illustrating a structure of a radio interface protocol in a control plane.
Figure 4:
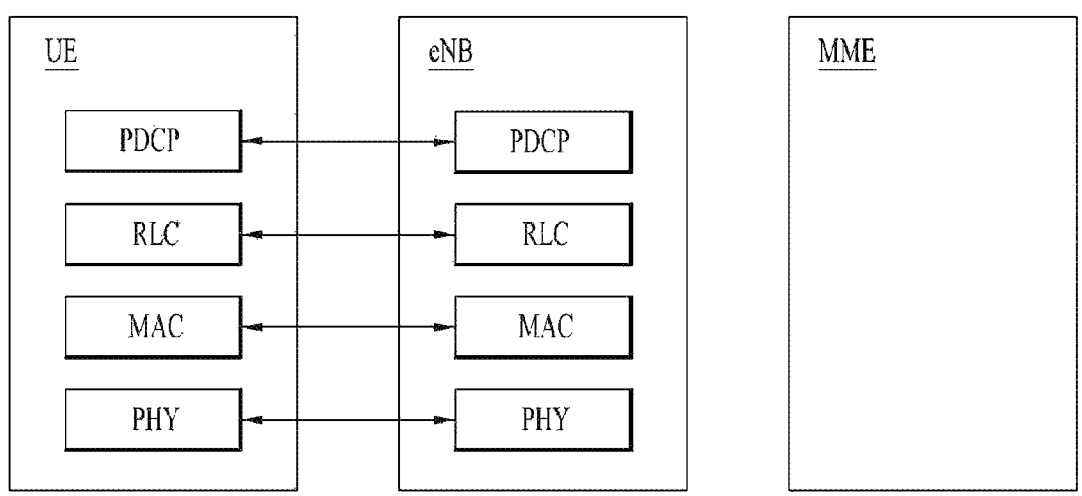
FIG. 4 is an exemplary diagram illustrating a structure of the radio interface protocol in a user plane.

FIG. 3 is an exemplary diagram illustrating a structure of a radio interface protocol in a control plane between a UE and a base station and FIG. 4 is an exemplary diagram illustrating a structure of the radio interface protocol in a user plane between a UE and a base station.

The radio interface protocol is based on 3GPP radio access network standards. The radio interface protocol is horizontally composed of a physical layer, a data link layer and a network layer and vertically divided into a user plane for data information transfer and a control plane for control signaling delivery.

The protocol layers can be divided into L1 (first layer), L2 (second layer) and L3 (third layer) on the basis of three lower layers of the open system interconnection (OSI) reference model widely known in communication systems.

Hereinafter, each layer of the radio protocol in the control plane illustrated in FIG. 3 and the radio protocol in the user plane illustrated in FIG. 4 will be described.

The physical layer that is the first layer provides an information transfer service using a physical channel. The physical layer is connected to a higher medium access control layer through a transport channel and data is transferred between the medium access control layer and the physical layer through the transport channel. In addition, data is transferred between different physical layers, that is, physical layers of a transmitter and a receiver, through a physical channel.

A physical channel is composed of subframes in the time domain and subcarriers in the frequency domain. Here, one subframe is composed of a plurality of symbols and a plurality of subcarriers in the time domain. One subframe is composed of a plurality of resource blocks and one resource block is composed of a plurality of symbols and a plurality of subcarriers. A transmission time interval (TTI) that is a unit time of data transmission is 1 ms corresponding to one subframe.

Physical channels present in the physical layers of the transmitter and the receiver can be classified into a physical downlink shared channel (PDSCH) and a physical uplink shared channel (PUSCH) that are data channels and a physical downlink control channel (PDCCH), a physical control format indicator channel (PCFICH), a physical hybrid-ARQ indicator channel (PHICH) and a physical uplink control channel (PUCCH) that are control channels according to 3GPP LTE.

The second layer has various layers.

First, a medium access control (MAC) layer of the second layer serves to map various logical channels to various transport channels and performs logical channel multiplexing of mapping various logical channels to a single transport channel. The MAC layer is connected to an RLC layer that is a higher layer through a logical channel, and logical channels are classified divided into a control channel carrying information of the control plane and a traffic channel carrying information of the user plane according to types of transmitted information.

The radio link control (RLC) layer of the second layer performs segmentation and concatenation of data received from a higher layer to control a data size such that the data can be suitable to be transmitted by a lower layer in a radio period.

A packet data convergence protocol (PDCP) layer of the second layer executes a header compression function of reducing the size of an IP packet header containing unnecessary control information that is relatively large in order to efficiently transmit an IP packet such as IPv4 or IPv6 in a radio period with a narrow bandwidth. In addition, the PDCP layer also executes a security function in LTE systems. The security function includes ciphering for preventing data interception of a third party and integrity protection for preventing data manipulation of a third party.

A radio resource control (RRC) layer that is the highest layer of the third layer is defined only in the control plane and controls logical channels, transport channels and physical channels in association with configuration, re-configuration and release of a radio bearer (RB). Here, the RB means a service provided by the second layer for data transfer between a UE and the E-UTRAN.

A UE is in an RRC connected mode when there is RRC connection between the RRC layer of the UE and the RRC layer of a wireless network, the UE and in an RRC idle mode if not.

Hereinafter, an RRC state of a UE and an RRC connection method will be described. An RRC state means logical connection of the RRC of a UE and the RRC of the E-UTRAN. A case in which the RRC of the UE and the RRC of the E-UTRAN are connected is referred to as an RRC_CONNECTED state and a case in which the RRC of the UE and the RRC of the E-UTRAN are not connected is referred to as an RRC_IDLE state. Since RRC connection is present for a UE in the RRC_CONNECTED state, the E-UTRAN can detect presence of the UE in a cell unit and thus can effectively control the UE. On the other hand, the E-UTRAN cannot detect presence of a UE in the RRC_IDLE state and manages a core network in a tracking area (TA) unit that is an area unit larger than a cell. That is, with respect to a UE in the RRC_IDLE state, only presence or absence of the UE is detected in units of an area larger than a cell and the UE needs to switch to the RRC_CONNECTED state to be provided with a conventional mobile communication service such as audio or data. Each TA is identified through tracking area identity (TAI). A UE can configure TAI through tracking area code (TAC) that is information broadcast in a cell.

When a user initially powers on a UE, the UE discovers an appropriate cell, establishes RRC connection with the cell, and registers information of the UE with a core network. Then, the UE remains in an RRC_IDLE state. The UE in the RRC_IDLE state (re)selects a cell as necessary and checks system information or paging information. This is referred to as camp on in the cell. The UE in the RRC_IDLE state establishes RRC connection with the RRC of the E-UTRAN through an RRC connection procedure when the UE needs to establish RRC connection and switches to an RRC_CONNECTED state. The UE in the RRC_IDLE state needs to establish RRC connection in many cases, for example, when the user needs to attempt to make a call or to transmit data, when a response message to a paging message received from the E-UTRAN is transmitted, and the like.

A non-access stratum (NAS) layer higher than the RRC layer executes functions such as session management and mobility management.

Hereinafter, the NAS layer illustrated in FIG. 3 will be described in detail.

Evolved session management (eSM) belonging to the NAS layer executes functions such as default bearer management and dedicated bearer management and controls a UE to use a PS service from a network. Default bearer resources are characterized by being allocated from a network when a specific packet data network (PDN) is initially accessed. Here, the network allocates an IP address available for a UE such that the UE can use a data service and also allocates QoS of a default bearer. LTE supports two types of bearers: a bearer having guaranteed bit rate (GBR) QoS characteristics which guarantees a specific bandwidth for data transmission/reception and a non-GBR bearer having best effort QoS characteristics without guaranteeing a bandwidth. The non-GBR bearer is allocated to a default bearer. A bearer having GBR or non-GBR QoS characteristics can be allocated to the dedicated bearer.

A bearer allocated by a network to a UE is called an evolved packet service (EPS) bearer and the network allocates a single ID when allocating the EPS bearer. This is called an EPS bearer ID. A single EPS bearer has QoS characteristics of a maximum bit rate (MBR) and/or a guaranteed bit rate (GBR).

Figure 5:
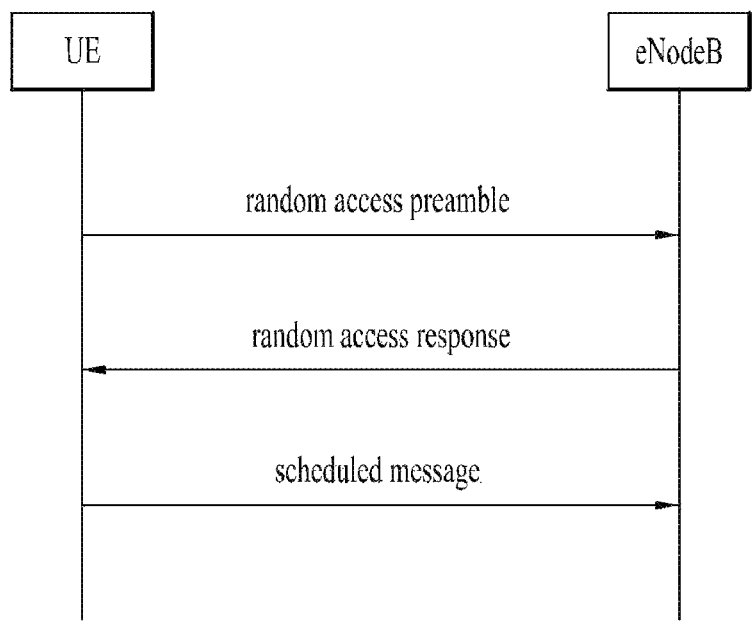
FIG. 5 is a flow diagram illustrating a radon access procedure.

FIG. 5 is a flowchart illustrating a random access procedure in 3GPP LTE.

The random access procedure is used for a UE to obtain UL synchronization with a base station or to be allocated with UL radio resources.

The UE receives a root index and a physical random access channel (PRACH) configuration index from an eNodeB. There are 64 candidate random access preambles defined by a Zadoff-Chu (ZC) sequence for each cell, and the root index is a logical index for the UE to generate the 64 candidate random access preambles.

Transmission of random access preambles is limited to specific time and frequency resources for each cell. The PRACH configuration index indicates a specific subframe and preamble format in which the random access preambles can be transmitted.

The UE transmits an arbitrarily selected random access preamble to the eNodeB. The UE selects one of the 64 candidate random access preambles. Then, the UE selects a subframe corresponding to the PRACH configuration index. The UE transmits the selected random access preamble in the selected subframe.

Upon reception of the random access preamble, the eNodeB transmits a random access response (RAR) to the UE. The random access response is detected through two steps. First, the UE detects a PDCCH masked with a random access-RNTI (RA-RNTI). The UE receives the random access response in a medium access control (MAC) protocol data unit (PDU) on a PDSCH indicated by the detected PDCCH.

Figure 6:
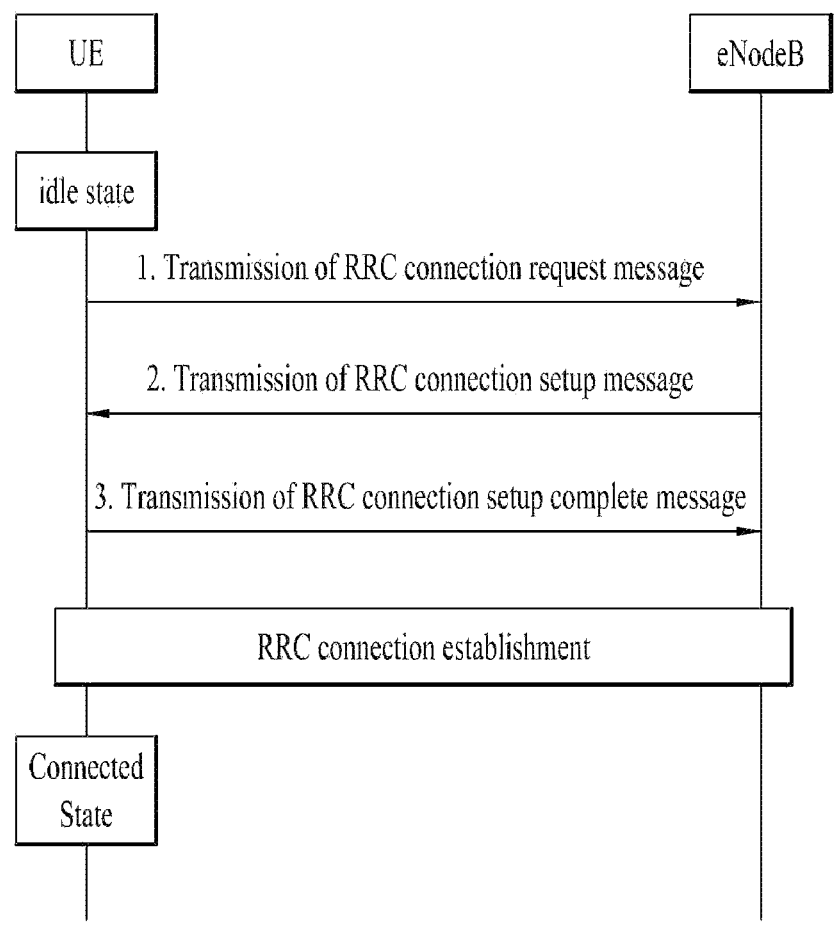
FIG. 6 illustrates a connection process in a radio resource control (RRC) layer.

FIG. 6 illustrates a connection process in an RRC layer.

As illustrated in FIG. 6, an RRC state according to whether RRC connection is established is illustrated. The RRC state represents whether an entity of the RRC layer of a UE is logically connected to an entity of the RRC layer of an eNodeB. A state of logical connection is referred to as an RRC connected state and a non-connected state is referred to as an RRC idle state.

Since a UE in the connected state has RRC connection, the E-UTRAN can detect the presence of the UE in a cell unit and thus can effectively control the UE. On the other hand, a UE in the idle mode cannot be detected by an eNodeB and is managed by a core network in a tracking area unit larger than a cell unit. The tracking area is a unit of a set of cells. That is, only presence or absence of an idle mode UE is detected in a large area unit and the UE needs to switch to a connected state to be provided with a conventional mobile communication service such as audio or data.

When a user initially powers on a UE, the UE discovers an appropriate cell and remains in an idle state in the cell. The UE in the idle state establishes RRC connection with the RRC layer of an eNodeB through an RRC connection procedure when the UE needs to establish RRC connection and switches to an RRC connected state.

The UE in the idle state needs to establish RRC connection in many cases, for example, when the user needs to attempt to make a call or to transmit uplink data, when a response message to a paging message received from the E-UTRAN is transmitted, and the like.

To establish RRC connection with the eNodeB, the UE in the idle state needs to perform the RRC connection procedure as described above. The RRC connection procedure includes a process in which the UE transmits an RRC connection request message to the eNodeB, a process in which the eNodeB transmits an RRC connection setup message to the UE, and a process in which the UE transmits an RRC connection setup complete message to the eNodeB. These processes will be described in more detail as follows with reference to FIG. 6.

1) When the UE in the idle state intends to establish RRC connection due to attempt to cell, attempt to transmit data or response to paging of the eNodeB, the UE transmits the RRC connection request message to the eNodeB.

2) Upon reception of the RRC connection request message from the UE, the eNB accepts the RRC connection request of the UE when there are sufficient radio resources and transmits the RRC connection setup message that is a response message to the UE.

3) Upon reception of the RRC connection setup message, the UE transmits the RRC connection setup complete message to the eNodeB. Upon successful transmission of the RRC connection setup message, the UE establishes RRC connection with the eNodeB and switches to an RRC connected mode.

Figure 7:
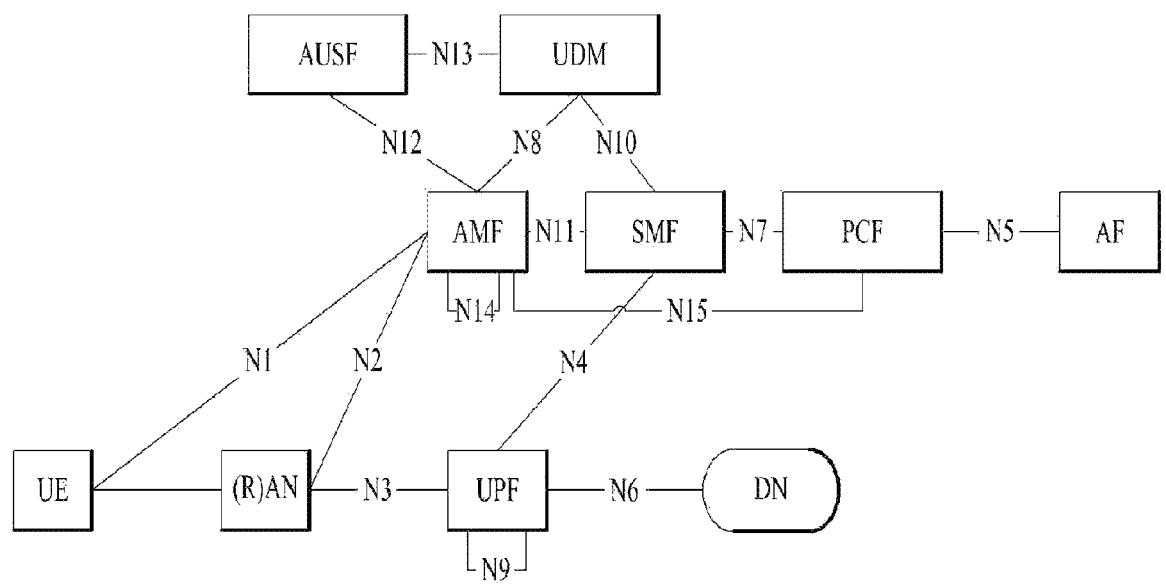
FIG. 7 illustrates a 5G system.

The MME in the conventional EPC is divided into an access and mobility management function (AMF) and a session management function (SMF) in a next generation system (or 5G core network (CN)). Accordingly, NAS interaction and mobility management (MM) with respect to UEs are performed by the AMF and session management (SM) is performed by the SMF. In addition, the SMF manages a user plane function (UPF) that is a gateway having a user-plane function, that is, routing user traffic. This can be considered that the SMF takes charge of the control-plane part of S-GW and P-GW of the conventional EPC and the UPF takes charge of the user-plane part. One or more UPFs may be present between a RAN and a data network (DN) for user traffic routing. That is, the conventional EPC may be configured in 5G as illustrated in FIG. 7. Further, a protocol data unit (PDU) session is defined in the 5G system as a concept corresponding to PDN connection in the conventional EPS. The PDU session refers to association between a UE and a DN providing PDU connectivity service of the Ethernet type or unstructured type as well as the IP type. In addition, unified data management (UDM) executes a function corresponding to the HSS of the EPC and a policy control function (PCF) executes a function corresponding to the PCRF of the EPC. To satisfy requirements of the 5G system, the functions may be extended and provided. Refer to TS 23.501 for details of 5G system architecture, each function and each interface.

The 5G system conforms to TS 23.501, TS 23.502 and TS 23.503. Accordingly, these standards are applied to the 5G system in the present disclosure. In addition, TS 38.300 is applied to NG-RAN related architecture and details. The 5G system also supports non-3GPP access, and thus architecture and network elements for supporting non-3GPP access are described in section 4.2.8 of TS 23.501 and procedures for supporting non-3GPP access are described in section 4.12 of TS 23.502. As an example of non-3GPP access, WLAN access is typical which can include both a trusted WLAN and an untrusted WLAN. The access and mobility management function (AMF) of the 5G system performs registration management (RM) and connection management (CM) for non-3GPP access as well as 3GPP access. In this manner, the same AMF serves a UE for 3GPP access and non-3GPP access belonging to the same PLMN, and thus a single network function can support authentication, mobility management and session management for a UE registered through two different accesses in an integrated and efficient manner.

An operation when downlink data (or downlink traffic) of a PDU session associated with non-3GPP access is generated in a case where a UE registered with the same PLMN for both 3GPP access and non-3GPP access is CM-IDLE in non-3GPP access is described in section 4.2.3.3 of TS 23.502. Specifically, in the aforementioned case, the AMF can page the UE through 3GPP access when 3GPP access is CM-IDLE (refer to step 4b in section 4.2.3.3 of TS 23.502). On the other hand, when 3GPP access is CM-CONNECTED, the AMF can transmit a NAS notification message to the UE through 3GPP access (refer to step 4c in section 4.2.3.3 of TS 23.502).

Meanwhile, in 5GS, user planes need not be activated for all generated PDU sessions even if a UE is in a CM-CONNECTED state. That is, only a user plane for a PDU session that needs to be used (or that generates data) can be selectively activated. (Refer to "Selective activation and deactivation of UP connection of existing PDU session" in section 5.6.8 of TS 23.501. Hereinafter, user plane activation for a PDU session may be referred to as activation of user plane connection for the PDU session, N3 activation for the PDU session, N3 tunnel activation for the PDU session, and activation of the PDU session. In addition, user plane deactivation for a PDU session may be referred to as deactivation of user plane connection for the PDU session, N3 deactivation for the PDU session, N3 tunnel deactivation for the PDU session, and deactivation of the PDU session.)

Meanwhile, an RRC inactive state is defined in 5GS. Refer to 5.3.3.2.3 CM-CONNECTED state, 5.3.3.2.5 CM-CONNECTED with RRC Inactive state, 5.4.2 UE reachability in CM-CONNECTED, and 4.8 RAN-CN interactions of 3GPP TS 23.501v15.1.0 for details of the RRC inactive state. The aforementioned referenced descriptions are included in the present disclosure as related art.

With respect to a UE in an RRC inactive state, operation of CN-initiated selective deactivation of UP connection of an existing PDU session in section 4.3.7 of TS 23.502v15.1.0 can be performed. In this procedure, when NG-RAN receives an N2 PDU session resource release command in step 6, step 7 (RAM specific resource release) can be generated. The NG-RAN needs to page the UE (i.e., RAN paging) in order to perform step 7, that is, an operation of releasing resources for the UE and the deactivated PDU session. As a paging result, the UE switches from the RRC inactive state to an RRC connected state, and then the NG-RAN can perform a radio resource release operation for the UE.

However, the aforementioned paging operation and the operation of switching the UE from the RRC inactive state to the RRC connected state are for the purpose of deactivating the PDU session of the UE rather than supporting a service for the UE and thus it is difficult to regard them as necessary operations. Accordingly, signal transmission/reception methods relating to a PDU session (resource release) which can reduce the aforementioned ineffectiveness will be described below.

Embodiment 1

Figure 8:
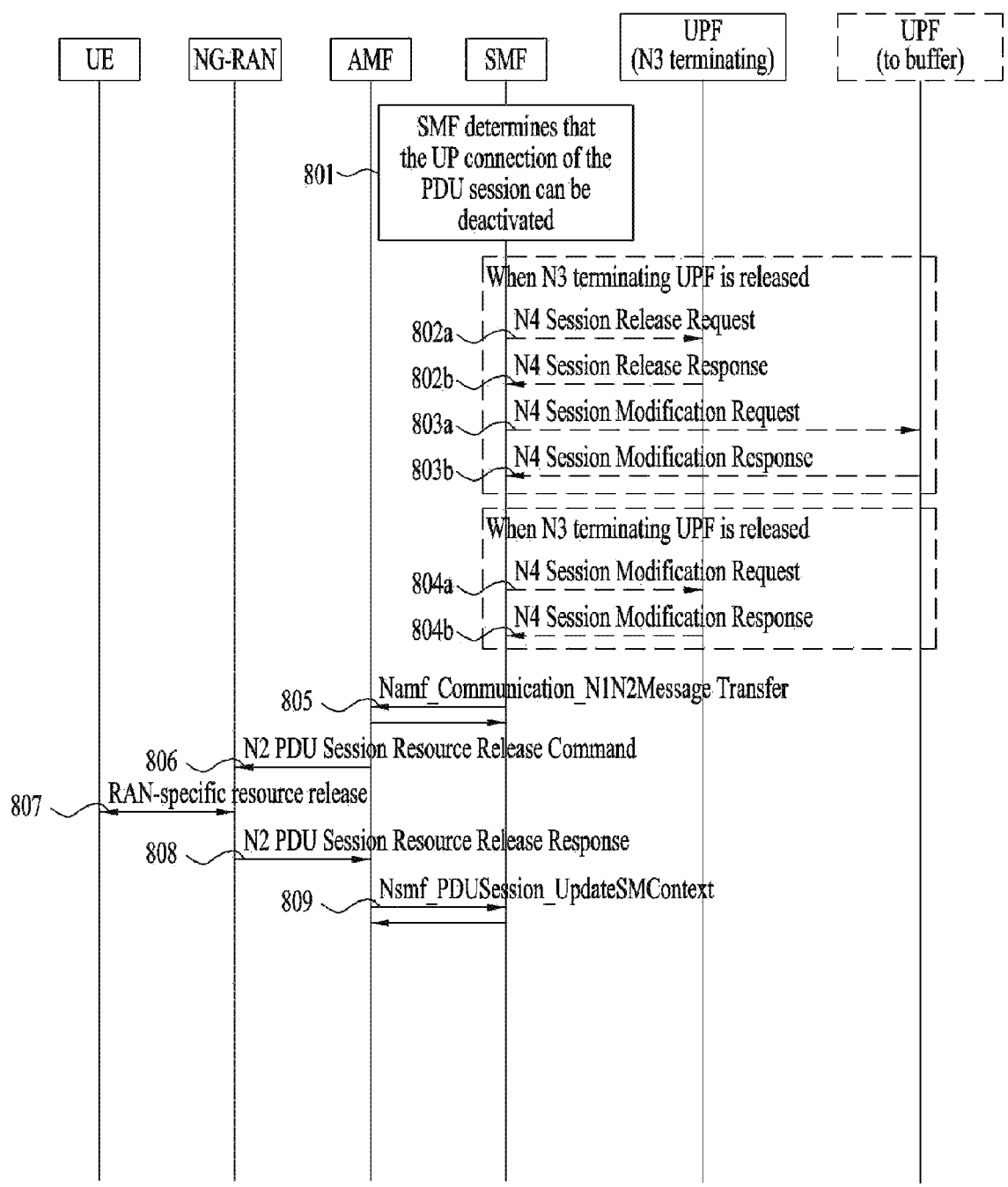
FIGS. 8 to 13 illustrate embodiments of the present disclosure.

In a first embodiment, for a UE in an RRC inactive state, NG-RAN pends an interaction with the UE upon reception of a PDU session resource release command from an AMF. Then, PDU session deactivation is signaled when the UE switches to an RRC connected state. The first embodiment will be described in detail with reference to FIG. 8.

In step S801, an SMF determines that UP connection of a PDU session can be deactivated in the following cases.
  All QoS flows of the PDU session are rejected by a target NG-RAN during a handover procedure.
  A UPF detects that the PDU session does not have data transmission for a designated deactivation time.
  The AMF notifies the SMF that the UE has moved out of a LADN service area for an LADN PDU session.
  The AMF notifies the SMF that the UE has exited an allowable area.

The SMF can determine that a UPF of an N3 termination point will be released. In this case, the SMF proceeds to step S802 and step S803. When the SMF determines that the UPF of the N3 termination point will be maintained, the SMF proceeds to step S804.

Step S802: The SMF can start an N4 session release procedure in order to release an intermediate UPF of the N3 termination point. When there are multiple intermediate UPFs, this step can be performed when each UPF is released. The SMF needs to start an N4 session change procedure for a UPF (i.e., an N9 termination point or a PDU session anchor) that accesses the UPF released in step S803.

Step S803: When the intermediate UPF of the N3 termination point is released in step S802, the SMF starts an N4 session correction procedure for a UPF (PDU session anchor or another intermediate UPF) connected to the released UPF and indicates necessity for removal of tunnel information about an N3 tunnel of the corresponding PDU session. In this case, the UPF connected to the released UPF buffers a DL packet with respect to the PDU session. If not, the N4 session correction procedure is generated toward the N3 termination point.

Step S804: When the UPF of the N3 termination point is not released, the SMF starts the N4 session correction procedure for indicating necessity for removal of AN tunnel information about the N3 tunnel of the corresponding PDU session. When the PDU session corresponds to LADN, the SMF can notify the UPF that downlink data with respect to the PDU session will be deleted and/or an additional data notification message will not be provided.

In step S805, the SMF calls Namf_Communication_N1N2MessageTransfer service operation (N2 SM information (PDU session ID)) in order to release NG-RAN resources associated with the PDU session.

In step S806, the AMF sends a session resource release command including the N2 SM information (PDU session ID) received from the SMF through N2 to the NG-RAN.

In step S807, the base station (e.g., NG-RAN) pends an interaction with the UE. Upon reception of the message of S806, the NG-RAN does not perform interaction with the UE when the UE is in the RRC inactive state. This can be interpreted as pending of interaction with the UE. This may mean that NG-RAN specific signaling exchange (e.g., RRC connection reconfiguration) is not performed. Further, this may mean that the NG-RAN does not perform an operation of releasing/updating a DRB with respect to the UE. The NG-RAN stores related information about the deactivated PDU session. That is, the NG-RAN stores which PDU session has been deactivated in UE context.

Subsequently, the UE in the RRC inactive state can transmit an RRC message for resumption to the base station. The RRC message for resumption is a response to RAN paging and may be transmitted by the UE. The UE in the RRC inactive state may transmit the RRC message to the NG-RAN in order to perform RAN notification area update, perform resumption or respond to RAN paging.

The UE can receive information indicating resource release as a response to the RRC message for resumption from the base station. Here, resource release is based on deactivation of the PDU session for the UE. Further, the information indicating resource release is transmitted when the base station receives a PDU session release command from a network. That is, as described above, the base station pends the interaction with the UE, and when the UE transmits the RRC message for resumption to the base station, releases resources of the PDU session deactivated in that procedure. That is, the NG-RAN can perform interaction with the UE which has been pended upon reception of the message of S806. This can be interpreted as an operation of notifying the UE of deactivation of the PDU session. Further, this can be interpreted as an operation for synchronizing with the UE with respect to PDU session deactivation state. Further, this can be interpreted as an operation for the NG-RAN to release/update a DRB with respect to the UE for the deactivated PDU session. The NG-RAN transmits a response message to the RRC message for resumption to the UE. The aforementioned operation of the base station, such as interaction with the UE, and transmission of the response message to the RRC message transmitted from the UE may be performed in a combined manner.

The NG-RAN checks an N2 PDU session resource release command with respect to the AMF in step S808 and the AMF calls Nsmf_PDUSession_UpdateSMContext service operation and confirms Namf service provided in step S805 in step S809.

As described above, the NG-RAN pends interaction with the UE and releases resources of the deactivated PDU session according to transmission of the UE triggered RRC message upon reception of the PDU session resource release command from the AMF, and thus the start of transmission of the RRC message for resumption is unrelated to the PDU session release command. The RRC message for resumption is transmitted by the UE for resumption of the UE. In addition, paging is performed when DL data has arrived, and RAN paging is unrelated to the PDU session release command received by the base station from the network.

Further, the RRC message for resumption is transmitted by the UE after the base station receives the PDU session release command from the network. The aforementioned resource release may be release of a data radio bearer (DRB).

Figure 9:
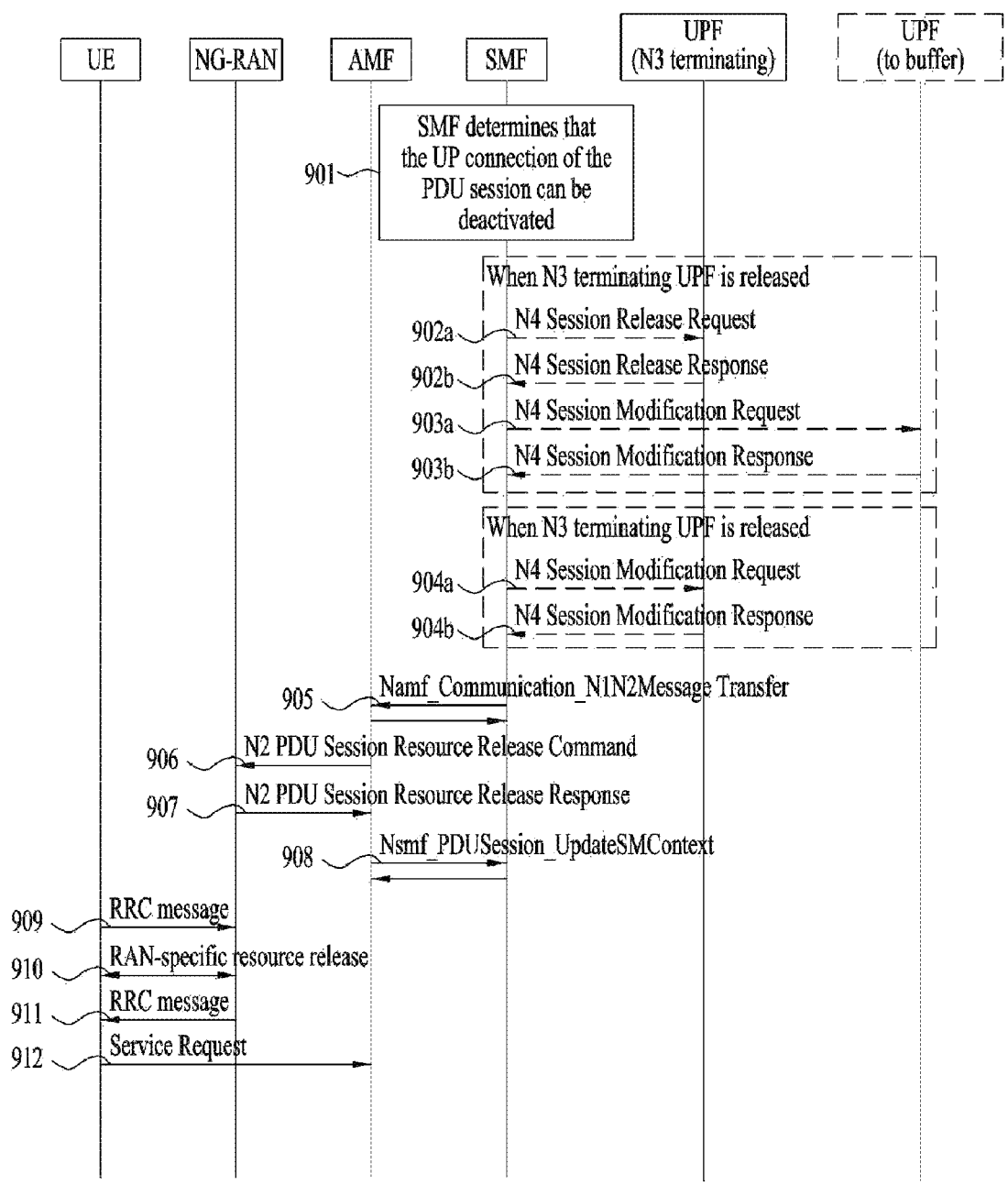

FIG. 9 illustrates a procedure related to PDU session release based on the above description. Most description of FIG. 9 is substituted with description corresponding to each step of FIG. 8. Description of steps S901 to S906 is substituted with description of steps S801 to S806 and description of steps S907 and S908 is substituted with description of steps S808 and S809.

In step S909, a UE in an RRC inactive state transmits an RRC message to the NG-RAN. The UE may perform this operation in order to perform RAN notification area update, perform resumption or respond to RAN paging.

In step S910, the NG-RAN performs interaction with the UE that has been pended after reception of the message of step S906. This can be interpreted as an operation for notifying the UE of deactivation of a PDU session. Further, this can be interpreted as an operation for synchronization with the UE with respect to PDU session deactivation state. In addition, this can be interpreted as an operation of the NG-RAN to release/update a DRB with respect to the UE with respect to the deactivated PDU session.

In step S911, the NG-RAN transmits a response message to step S909 to the UE. Steps S910 and S911 may be performed in a combined manner.

In step S912, if data to be transmitted with respect to the PDU session for which the UE has been notified of deactivation is generated, the UE transmits a service request message to the AMF for activation. Refer to section 4.2.3.2 (UE triggered service request) of TS 23.502v15.1.0 for this operation (including subsequent operations).

Embodiment 2

A second embodiment pertains to a method of rejecting a PDU session resource release command when the NG-RAN receives the PDU session resource release command from the AMF for a UE in an RRC inactive state.

Description of steps S1001 to S1006 is substituted with description of steps S801 to S806.

In step S1007, when the UE is in an RRC inactive state, the NG-RAN transmits a message indicating rejection of an N2 PDU session resource release command received in step S1006 to the AMF. For this, information representing rejection and/or the reason for rejection (e.g., the UE is in the RRC inactive state, PDU session resource release cannot be immediately performed, or the like) may be included in an N2 PDU session resource release response message or an N2 PDU session resource release reject message may be newly defined and used. Information representing the reason for rejection may be included in the newly defined message.

In determination of the rejection, the NG-RAN may determine unconditional rejection since the UE is in the RRC inactive state or determine rejection when one or more of the following conditions are satisfied. Unless one or more of the following conditions are satisfied, the NG-RAN performs the operation specified in section 4.3.7 of TS 23.502v15.1.0 by permitting PDU session resource release even when the UE is in the RRC inactive state.

a) A case in which NG-RAN specific signaling exchange (e.g., RRC connection reconfiguration) with the UE needs to be performed (a case in which operation of step 7 of section 4.3.7 of TS 23.502v15.1.0 needs to be performed). This may be interpreted as a case in which the NG-RAN needs to perform an operation of releasing/updating a DRB with respect to the UE.

b) A case in which priority of a QoS flow included in a PDU session is equal to or higher than a certain threshold. This may be, for example, a case in which a default priority level in TS 23.501v15.1.0 Table 5.7.4-1: Standardized 5QI to QoS characteristics mapping is equal to or less than a certain threshold (because the lower the value of the default priority level the higher the default priority level in the table).

c) A case in which an ARP value of a QoS flow included in a PDU session is equal to or higher than a certain threshold. This may be interpreted as a case in which the ARP value indicates an important/high-priority QoS flow.

d) A case in which a 5QI value of a QoS flow included in a PDU session corresponds to a certain value.

Figure 10:
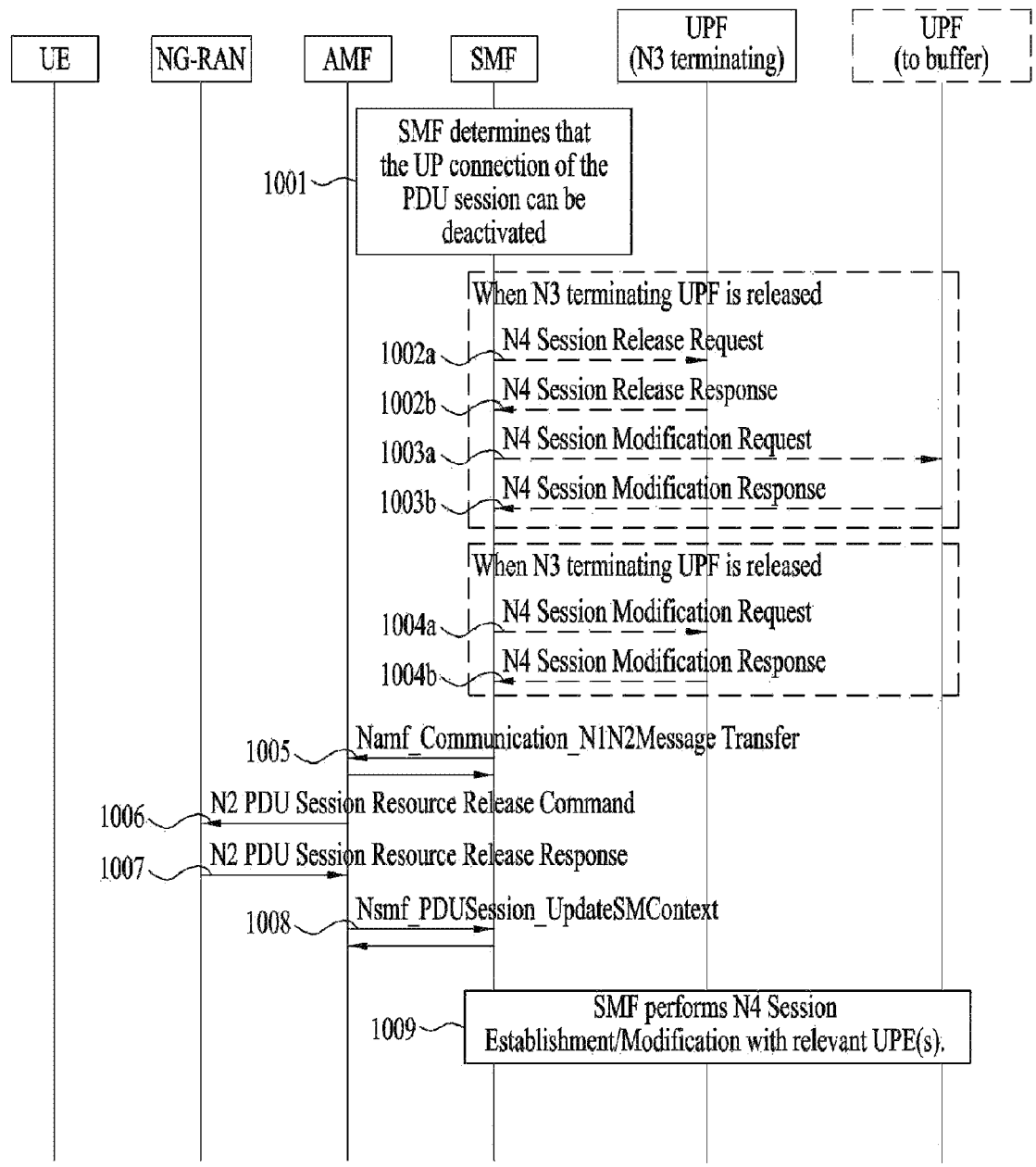
Figure 11:
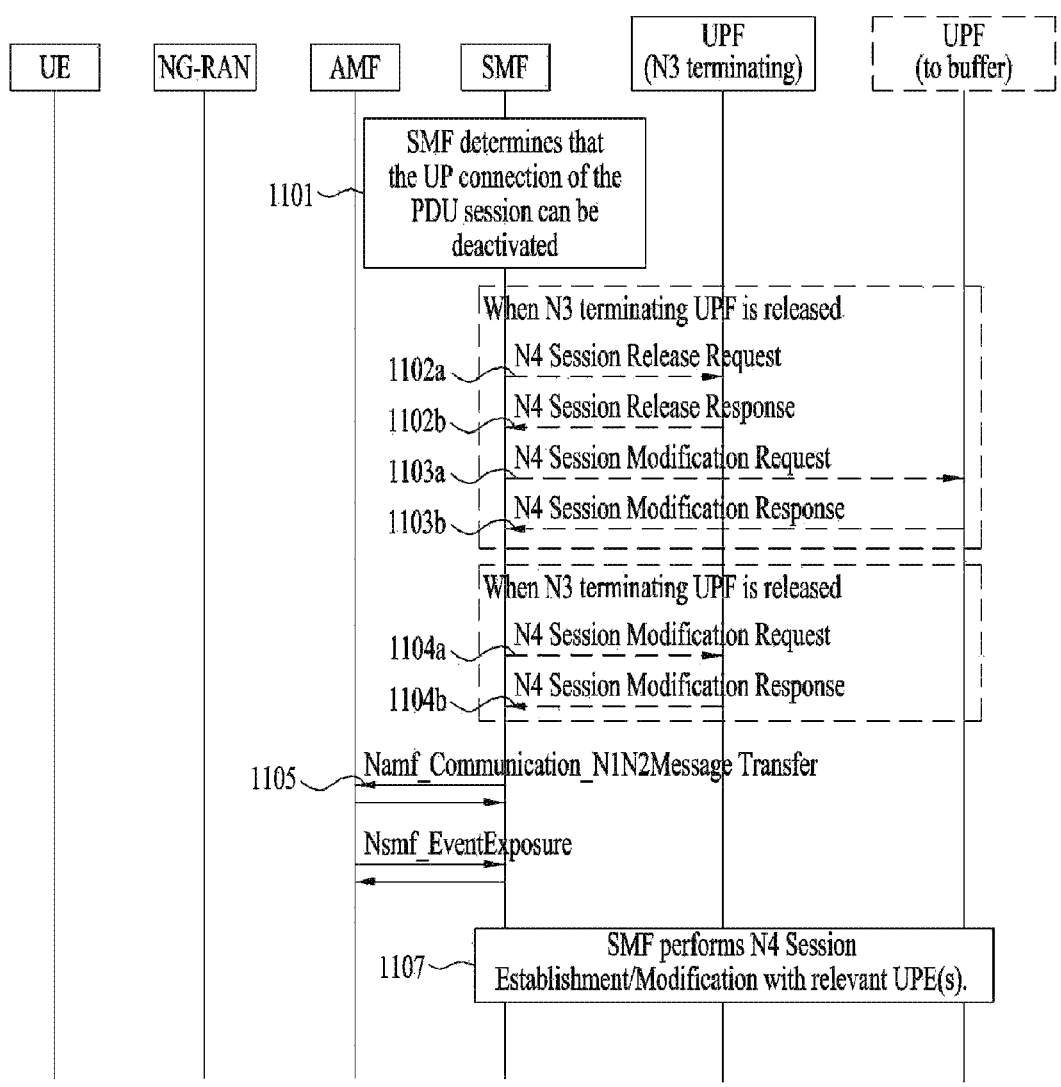

In step S1008, the AMF transmits a message representing that NG-RAN resource release request of the PDU session has been rejected or has failed to the SMF. Although this message is illustrated as a Namf_EventExposure message in FIG. 10, it may be another existing message or a newly defined message. The message may include information about the reason for rejection/reason for failure. This information may be included as it is or in a modified formed on the basis of information received from the NG-RAN.

In step S1009, the SMF performs an operation of restoring the N4 related operation with respect to the UE performed through steps S1002 to S1004. Consequently, an N3 terminating UPF is involved for the PDU session. This may be the same as the N3 terminating UPF initially involved for the PDU session or not.

Further, if intermediate UPF(s) are previously present, intermediate UPF(s) may be re-involved (the same UPF(s) or different UPF(s)) or not.

In the above description, release of the N3 terminating UPF and release of the intermediate UPF(s) if they are present are generated before the SMF sends a PDU session NG-RAN resource release request to the ANF. However, these operations may be performed after the SMF receives a message representing that the PDU session NG-RAN resource release has been successfully performed or will be performed from the AMF. In this case, step S1009 is unnecessary.

Embodiment 3

A third embodiment pertains to a method of rejecting a message requesting NG-RAN resource release of a PDU session when the AMF receives the message from the SMF for a UE in an RRC inactive state.

Description of steps S1101 to S1106 is substituted with description of steps S801 to S806.

In step S1106, in a case where the UE is in the RRC inactive state, when the AMF receives the message of step S1105 from the SMF, the AMF transmits a message representing rejection of the received message to the SMF. For this, information representing the request rejection and/or the reason for rejection (e.g., the UE is in the RRC inactive state, PDU session resource release cannot be immediately performed, or the like) may be included in Namf_EventExposure message or a message may be newly defined and used. The newly defined message may include information representing the reason for rejection. Here, the AMF is assumed to ascertain that the UE is in the RRC inactive state. It is assumed that the AMF may ascertain that the UE is in the RRC inactive state because the NG-RAN notifies the AMF of the state of the UE as described in section 4.8.3 (N2 notification procedure) of TS 23.502v15.1.0 or the AMF may ascertain that the UE is in the RRC inactive state through other methods.

The AMF may provide information representing rejection and additionally the reason for rejection to the SMF while sending a response to the message received in step S1105 instead of transmitting the aforementioned message representing rejection in step S1106.

On the other hand, when the AMF does not ascertain that the UE is in the RRC inactive state, the AMF may ascertain whether the UE is in the RRC inactive state by inquiring the NG-RAN about the state of the UE upon reception of the message of step S1105 from the SMF.

In step S1107, the SMF performs an operation of restoring the N4 related operation with respect to the UE performed through steps S1002 to S1004. Consequently, an N3 terminating UPF is involved for the PDU session. This may be the same as the N3 terminating UPF initially involved for the PDU session or not. Further, if intermediate UPF(s) are previously present, intermediate UPF(s) may be re-involved (the same UPF(s) or different UPF(s)) or not.

In the above description, release of the N3 terminating UPF and release of the intermediate UPF(s) if they are present are generated before the SMF sends a PDU session NG-RAN resource release request to the ANF. However, these operations may be performed after the SMF receives a message representing that the PDU session NG-RAN resource release has been successfully performed or will be performed from the AMF. In this case, step S1107 is unnecessary.

Embodiment 4

Hereinafter, a method in which the AMF notifies the SMF that the UE has switched to an RRC inactive state when the UE has switched to the RRC inactive state and the SMF disables a PDU session selective deactivation operation while the UE is in the RRC inactive state will be described.

In step S1201, the NG-RAN transmits a message representing that the UE is in the RRC inactive state, that is, UE notification, to the AMF. This message may be transmitted because the AMF sends a request for notification of UE state to the NG-RAN as described in section 4.8.3 (N2 notification procedure) of TS 23.502v15.1.0. However, the present disclosure is not limited thereto.

In step S1202, the AMF transmits a message representing that the UE is in the RRC inactive state to the SMF. This is for the purpose of allowing the SMF to disable CN-initiated selective deactivation of UP connection of an existing PDU session, and information signaled to the SMF need not be an RRC inactive state. Accordingly, the information may be provided to the SMF along with RRC inactive state information or different information (e.g., information representing that PDU session resource release cannot be immediately performed, a request for disabling CN-initiated selective deactivation of UP connection of an existing PDU session, and the like) may be provided to the SMF.

Figure 12:
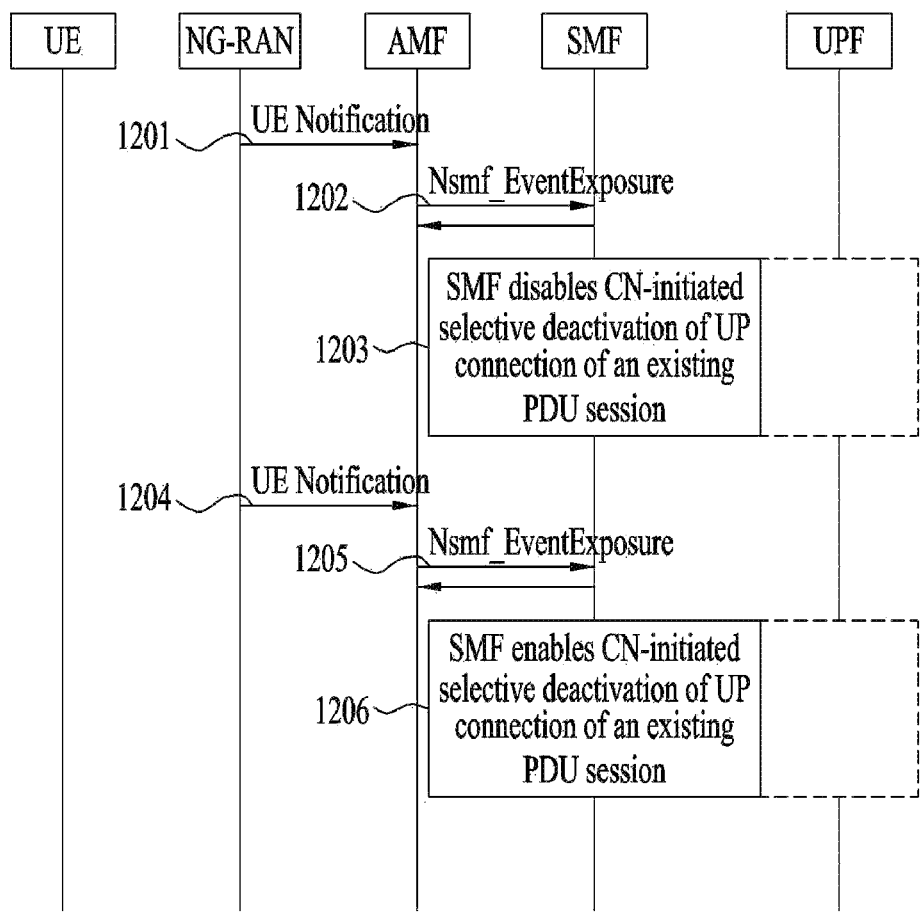
Figure 13:
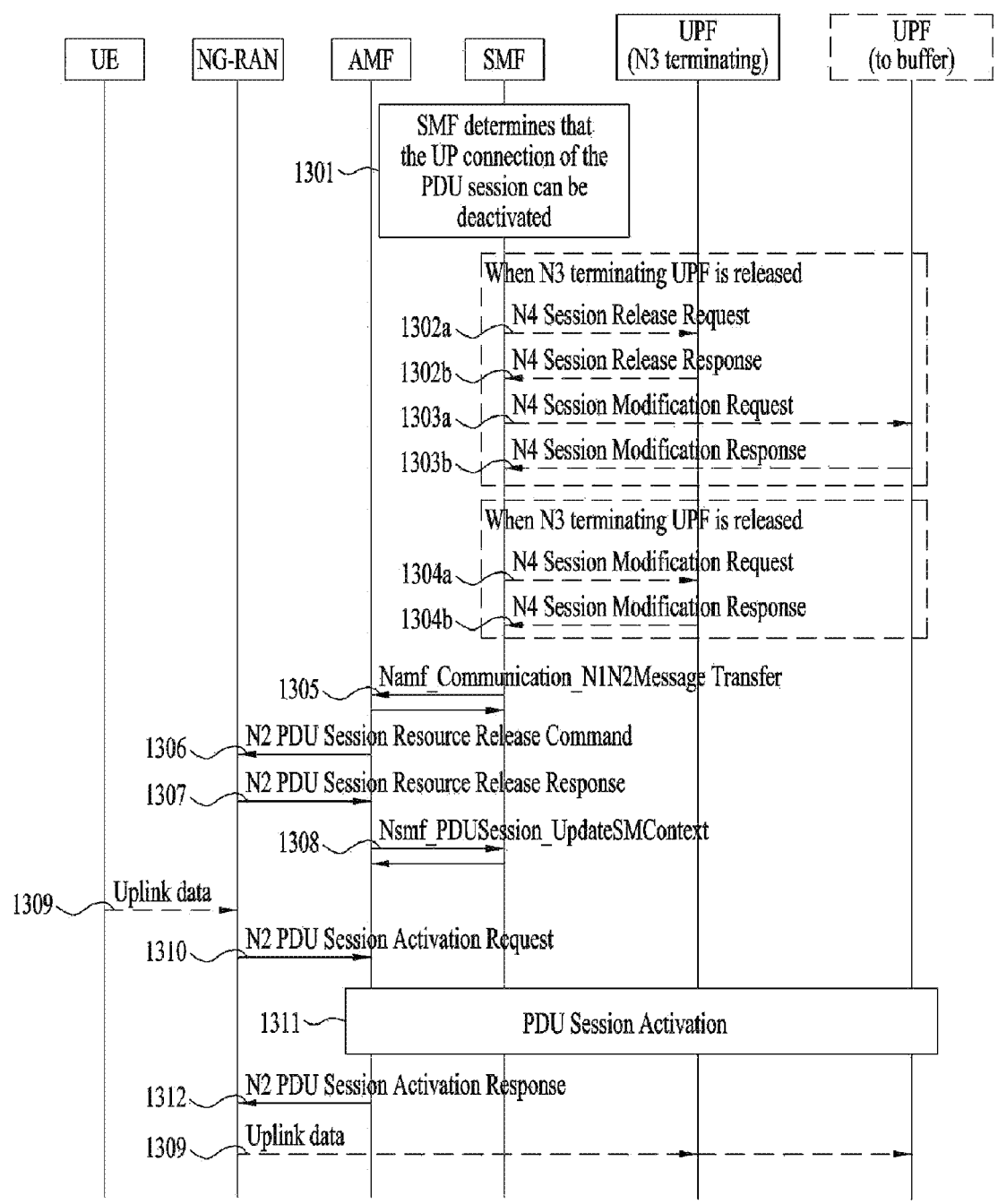
Figure 14:
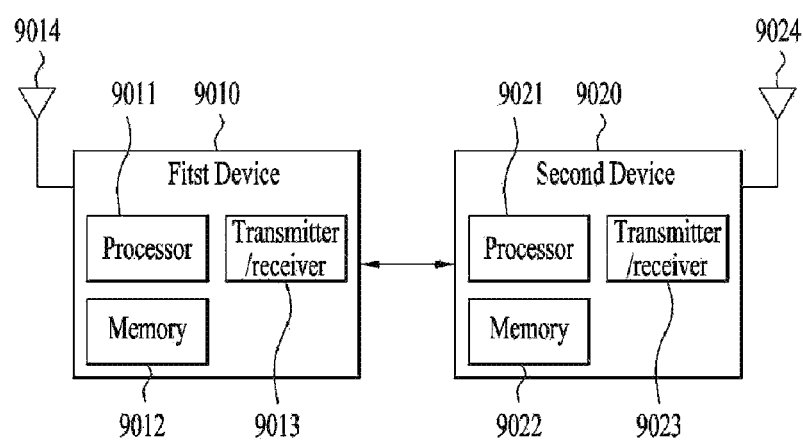
FIG. 14 illustrates configurations of node devices according to an embodiment of the present disclosure.

Although FIG. 12 illustrates the aforementioned message as Namf_EventExposure, the message may be another existing message or a newly defined message. The AMF transmits the message to all SMFs which serve the UE.

In step S1203, the SMF disables CN-initiated selective deactivation of UP connection of an existing PDU session. This operation may require interaction with a UPF. For example, when an inactivity timer is previously provided to a UPF such that the UPF detects inactivity with respect to a PDU session and notifies the SMF of the inactivity, the UPF may be instructed to perform this operation no longer.

In step S1204, the NG-RAN transmits a message representing that the UE is in an RRC connected state, that is, UE notification, to the AMF.

In step S1205, the AMF transmits a message representing that the UE is in the RRC connected state to the SMF. This is for the purpose of allowing the SMF to enable CN-initiated selective deactivation of UP connection of an existing PDU session, and information signaled to the SMF need not be an RRC connected state. Accordingly, the information may be provided to the SMF along with RRC connected state information or different information (e.g., information representing that PDU session resource release can be performed, a request for enabling CN-initiated selective deactivation of UP connection of an existing PDU session, and the like) may be provided to the SMF.

Although FIG. 12 illustrates the aforementioned message as Namf_EventExposure, the message may be another existing message or a newly defined message. The AMF transmits the message to all SMFs which serve the UE.

In step S1206, the SMF enables CN-initiated selective deactivation of UP connection of an existing PDU session. This operation may require interaction with a UPF. For example, an inactivity timer may be previously provided to a UPF and the UPF may be instructed to detect inactivity with respect to a PDU session and notify the SMF of the inactivity.

Embodiment 5

Hereinafter, a method in which the NG-RAN does not perform interaction with the UE upon reception of a PDU session resource release command from the AMF with respect to the UE in the RRC inactive state and requests activation of a PDU session of a core network upon reception of data about a deactivated PDU session from the UE will be described.

Description of steps S1401 to S1406 is substituted with description of steps S801 to S806.

When the UE is in the RRC inactive state, the NG-RAN does not perform interaction with the UE upon reception of the message of step S1406. This may mean that NG-RAN specific signaling exchange (e.g. RRC connection reconfiguration) is not performed. Further, this may mean that the NG-RAN does not perform an operation of releasing/updating a DRB with respect to the UE. Additionally, the NG-RAN can store related information about a deactivated PDU session. That is, the NG-RAN can store a deactivated PDU session on UE context. The stored information can be used for NG-RAN operation in the following step S1410.

Description of steps S1407 and S1408 is substituted with description of steps S808 and S809.

In step S1409, when data to be transmitted by a UE in the RRC inactive state is generated, the UE switches to the RRC connected state and transmits the data to the NG-RAN. The data is assumed to be data with respect to a PDU session deactivated in a core network including N3 period through steps S1401 to S1408. That is, since the DRB is maintained between the UE and the NG-RAN, the UE transmits the data to the NG-RAN.

In step S1410, the NG-RAN transmits a message for requesting activation of the PDU session to the AMF. This is for the purpose of activating the user plane of the PDU session in the N3 period and the core network.

In step S1411, the AMF transmits a message for requesting activation of the PDU session to the SMF, and thus an operation of activating the user plane in the N3 period and the core network is performed for the PDU session.

In step S1412, the AMF transmits a response message to S1410 to the NG-RAN.

This may be performed as an operation for activating the user plane in S1411, that is, N3 period.

In step S1413, the NG-RAN transmits the data to a setup N3 tunnel, that is, a UPF.

Devices to which the present disclosure is applicable

Hereinafter, devices to which the present disclosure is applicable will be described. FIG. 19 illustrates wireless communication devices according to an embodiment of the present disclosure.

Referring to FIG. 19, a wireless communication system may include a first device 9010 and a second device 9020.

The first device 9010 may be a base station, a network node, a transmitting terminal, a receiving terminal, a wireless device, a wireless communication device, a vehicle, a vehicle equipped with an autonomous driving function, a connected car, a unmanned aerial vehicle (UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

The second device 9020 may be a base station, a network node, a transmitting terminal, a receiving terminal, a wireless device, a wireless communication device, a vehicle, a vehicle equipped with an autonomous driving function, a connected car, a unmanned aerial vehicle, UAV), an Artificial Intelligence (AI) module, a robot, an Augmented Reality (AR) device, a Virtual Reality (VR) device, a Mixed Reality (MR) device, a hologram device, a public safety device, an Machine Type Communication (MTC) device, an Internet of Things (IoT) device, a medical device, a pin-tec device (or financial device), a security device, a climate/environmental device, devices related to 5G services, or other devices related to fourth industrial revolution fields.

For example, the terminal may include a cellular phone, a smart phone, a laptop computer, a digital broadcasting terminal, a personal digital assistants (PDA), a portable multimedia player (PMP), a navigation, a slate PC, a tablet PC, an ultrabook, a wearable device such as a smartwatch, a smart glass, or a head mounted display (HMD)), etc. For example, the HMD may be a display device worn on a head. For example, an HMD may be used to implement the VR, AR, or MR.

For example, the UAV may be a flying object that is not ridden by people but that flies by radio control signals. For example, the VR device may include a device that implements an object or background in a virtual world. For example, the AR device may include a device that connects and implements the object or background in the real world to the object or background in a real world. For example, the MR device may include a device that fuses and implements the object or background in the virtual world with the object or background in the real world. For example, the hologram device may include a device for implementing a 360-degree stereoscopic image by recording and reproducing stereoscopic information by utilizing a phenomenon of interference of light generated by the two laser lights meeting with each other, called holography. For example, the public safety device may include a video relay device or a video device that may be worn by a body of a user. For example, the MTC device and the IoT device may be a device which does not require direct human intervention or manipulation. For example, the MTC device and the IoT device may include a smart meter, a vending machine, a thermometer, a smart bulb, a door lock, or various sensors. For example, the medical device may be a device used for diagnosing, treating, alleviating, treating, or preventing a disease. For example, the medical device may be a device used for diagnosing, treating, alleviating, or correcting an injury or disability. For example, the medical device may be a device used for inspecting, replacing, or modifying a structure or function. For example, the medical device may be a device used for controlling pregnancy. For example, the medical device may include a medical treatment device, a surgical device, an (in vitro) diagnostic device, a hearing aid or a (medical) procedure device, and the like. For example, the security device may be a device installed to prevent a risk that may occur and to maintain safety. For example, the security device may be a camera, a CCTV, a recorder, or a black box. For example, the pin-tec device may be a device capable of providing financial services such as mobile payment. For example, the pin-tec device may include a payment device or a point of sales (POS). For example, the climate/environmental device may include a device for monitoring or predicting a climate/environment.

The first device 9010 may include at least one processor, such as a processor 9011, at least one memory, such as a memory 9012, and at least one transceiver, such as a transceiver 9013. The processor 9011 may perform the functions, procedures, and/or methods described above. The processor 9011 may perform one or more protocols. The processor 9011 may perform one or more layers of a radio interface protocol. The memory 9012 may be connected to the processor 9011 and store various types of information and/or commands. The transceiver 9013 may be connected to the processor 9011 and controlled to transmit/receive a radio signal.

Specifically, the at least one processor of the first device may transmit an RRC message for resumption in an RRC inactive state to a base station and receive information indicating resource release as a response to the RRC message for resumption from the base station, and the resource release may be caused by deactivation of a PDU session with respect to the UE.

The second device 9020 may include at least one processor, such as a processor 9021, at least one memory, such as a memory 9022, and at least one transceiver, such as a transceiver 9023. The processor 9021 may perform the functions, procedures, and/or methods described above. The processor 9021 may implement one or more protocols. For example, the processor 9021 may implement one or more layers of the radio interface protocol. The memory 9022 may be connected to the processor 9021 and store various types of information and/or commands. The transceiver 9023 may be connected to the processor 9021 and controlled to transmit/receive a radio signal.

The memory 9012 and/or the memory 9022 may be each connected inside or outside the processor 9011 and/or the processor 9021 and connected to other processors through various techniques such as wired or wireless connection.

The first device 9010 and/or the second device 9020 may have one or more antennas. For example, an antenna 9014 and/or an antenna 9024 may be configured to transmit and receive the radio signal.

In addition, the above-described detailed configurations of the first device 9010 and the second device 9020 can be implemented such that the above-described various embodiments of the present disclosure are independently applied thereto or two or more embodiments are simultaneously applied, and redundant description is omitted for clarity.

The above-described embodiments of the present disclosure may be implemented by various means. For example, the embodiments of the present disclosure may be implemented by hardware, firmware, software, or a combination thereof.

If the embodiments of the present disclosure are implemented by hardware, a method according to the embodiments of the present disclosure may be implemented by application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, or the like.

In the case of implementation by firmware or software, a method according to the embodiments of the present disclosure may be implemented in the form of a device, a procedure or a function for executing functions or operations described above. Software code may be stored in a memory unit and executed by a processor. The memory unit is located inside or outside the processor and may exchange data with the processor through various known means.

The detailed description of the exemplary embodiments of the present disclosure has been given to enable those skilled in the art to implement and practice the present disclosure. Although the present disclosure has been described with reference to the exemplary embodiments, those skilled in the art will appreciate that various modifications and variations can be made in the present disclosure without departing from the spirit or scope of the disclosure described in the appended claims. Therefore, the present disclosure is not intended to limit the embodiments disclosed herein but to give a broadest range matching the principles and new features disclosed herein.

INDUSTRIAL APPLICABILITY

Although the above-described various embodiments of the present disclosure focus on the 3GPP system, they can be applied to various wireless communication systems in the same manner.

What is claimed is:

1. A method of transceiving a signal related to a protocol data unit (PDU) session in a wireless communication system, performed by a user equipment (UE), the method comprising:
    wherein, based on i) a base station receiving a command to release a resource for a protocol data unit (PDU) session from an Access and Mobility Management Function (AMF), and ii) a user equipment (UE) being in a radio resource control (RRC) inactive state, a Radio Access Network (RAN) specific signaling exchange, between the UE and the base station, for releasing data radio bearers (DRBs) related to PDU session is skipped, transmitting, by the UE to the base station in the RRC inactive state, a first RRC message for resuming a RRC connected state from the RRC inactive state; and receiving, by the UE from the base station, a second RRC message in response to the transmission of the first RRC message, wherein the second RRC message includes information to instruct the UE to release the DRBs related to the PDU session.

2. The method of claim 1, wherein the first RRC message is transmitted irrespective of the command.

3. The method of claim 1, wherein the first RRC message is transmitted from the UE in order to resume the RRC active state.

4. The method of claim 1, wherein the first RRC message for resuming the RRC active state is transmitted from the UE as a response to radio access network (RAN) paging.

5. The method of claim 4, wherein the RAN paging occurs irrespective of the command.

6. The method of claim 1, wherein the first RRC message for resuming the RRC active state is transmitted from the UE, after the base station receives the command to release the resource for the PDU session from the AMF.

7. The method of claim 1, wherein the base station is an NG Radio Access Network (NG-RAN).

8. A user equipment (UE) device, in a wireless communication system, comprising:

a memory; and at least one processor coupled to the memory, wherein, based on i) a base station receiving a command to release a resource for a protocol data unit (PDU) session from an Access and Mobility Management Function (AMF), and ii) a user equipment (UE) being in a radio resource control (RRC) inactive state, a Radio Access Network (RAN) specific signaling exchange, between the UE and the base station, for releasing data radio bearers (DRBs) related to PDU session is skipped, wherein the at least one processor is configured to transmit, to the base station, a first radio resource control (RRC) message for resuming a RRC connected state from the RRC inactive state, and wherein the at least one processor is configured to receive, from the base station, a second RRC message in response to the transmission of the first RRC message, wherein the second RRC message includes information to instruct the UE to release the DRBs related to the PDU session.

9. The UE device of claim 8, wherein the UE device communicates with at least one of a mobile terminal, a network and a self-driving vehicle other than the UE device.

10. A method of transceiving a signal related to a protocol data unit (PDU) session in a wireless communication system, performed by a base station, the method comprising:

receiving a command to release a resource for the PDU session from an Access and Mobility Management Function (AMF), skipping a Radio Access Network (RAN) specific signaling exchange with a user equipment (UE) for releasing data radio bearers (DRBs) related to PDU session, based on the UE being in a radio resource control (RRC) inactive state, receiving, by the base station from the UE in the RRC inactive state, a first RRC message for resuming a RRC connected state from the RRC inactive state; and transmitting, by the base station to the UE, a second RRC message in response to the first RRC message, wherein the second RRC message includes information to instruct the UE to release the DRBs related to the PDU session.

11. The method of claim 1, wherein the RAN specific signaling exchange is different from the second RRC message.

\* \* \* \* \*